Nov. 30, 1943.  J. K. WOOD  2,335,833
SUPPORTING AND BRACING DEVICE
Filed March 9, 1942   2 Sheets-Sheet 1
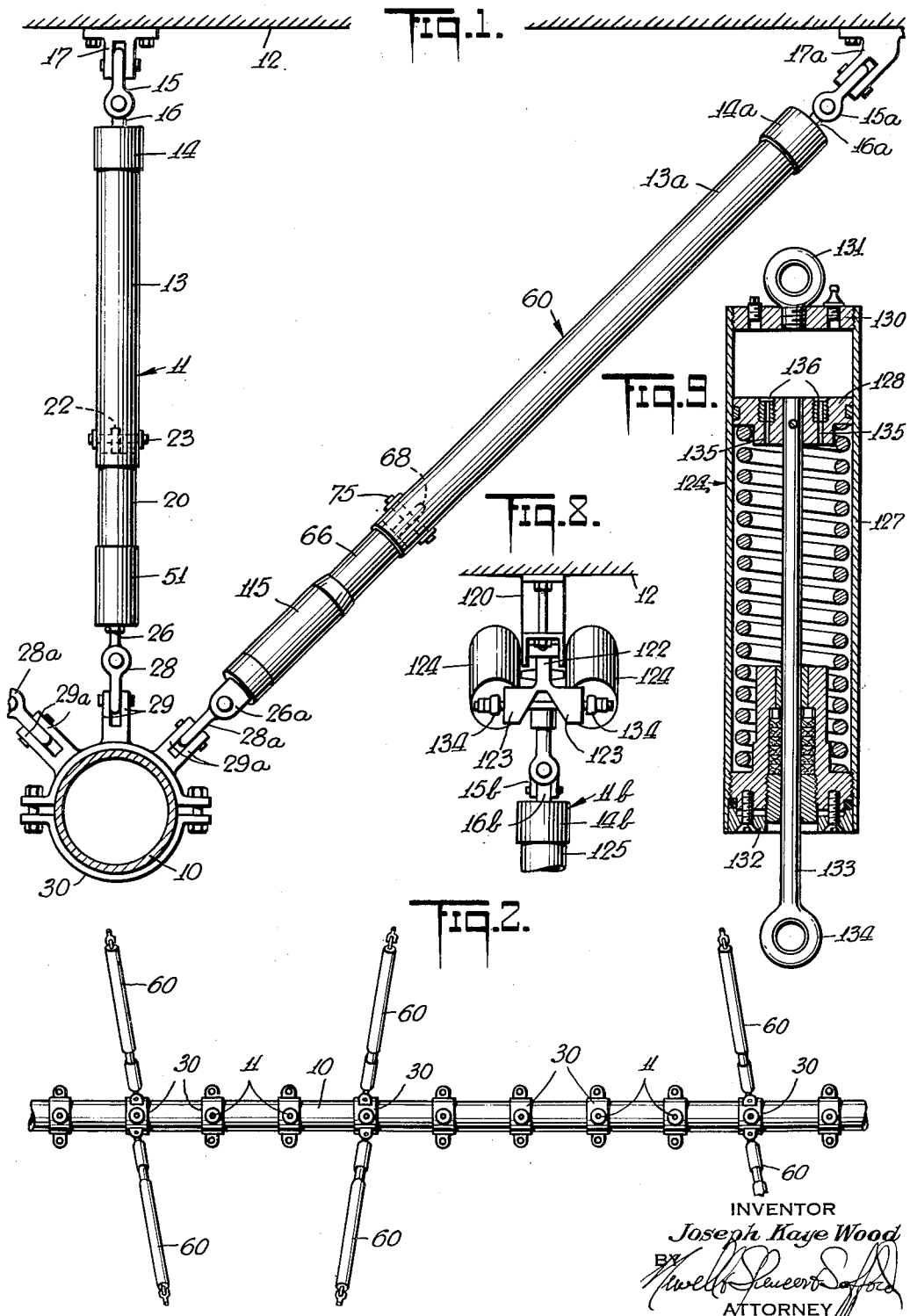
INVENTOR
Joseph Kaye Wood
ATTORNEY Nov. 30, 1943.  J. K. WOOD  2,335,833
SUPPORTING AND BRACING DEVICE
Filed March 9, 1942   2 Sheets-Sheet 2
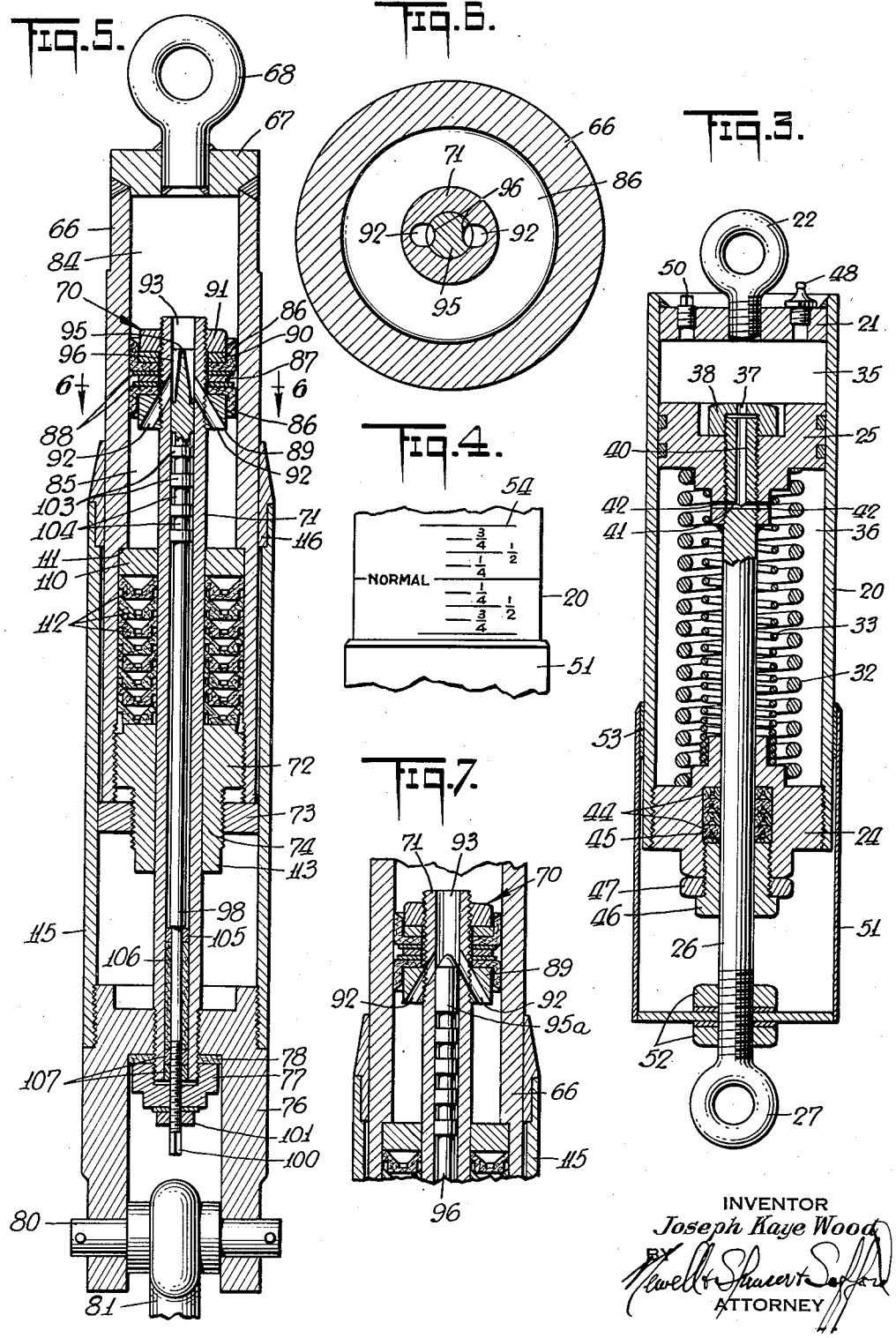
INVENTOR
Joseph Kaye Wood
ATTORNEY Patented Nov. 30, 1943

2,335,833

UNITED STATES PATENT OFFICE 2,335,833

SUPPORTING AND BRACING DEVICE

Joseph Kaye Wood, New York, N. Y., assignor to General Spring Corporation, New York, N. Y., a corporation of New York Application March 9, 1942, Serial No. 433,883

3 Claims. (Cl. 248—59)

The present application is a continuation-in-part of my copending application, Serial No. 390,415, filed April 25, 1941, and relates to devices for supporting and bracing pipe lines against sway, vibration and shock.

Various pipe lines, especially those in marine power plants, are subject to vibration or swaying during normal operations; and particularly in war times, may be subjected to violent shock resulting from collision or explosion. This agitation may become destructive either to the pipe line itself or to its connections with other apparatus.

It is not feasible to support the pipe lines rigidly from bracing structures, since the differential expansion due to temperature changes also may result in destructive stresses; and if ordinary flexible supports are used, which have a definite period of vibration, even normal vibrations may be amplified by resonance so as to become highly destructive.

It is accordingly an object of the present invention to provide a new and improved device for effectively supporting and bracing a pipe line or other supported structure against vibration or shock.

Another object is to provide a bracing device, which automatically varies the resistance to the movement of the pipe line, etc., according to the rate of this movement, so that gradual thermal movements of the pipe line are substantially unimpeded, while the violent movements such as those developed by explosion or collision are most effectively cushioned.

A further object is to provide a bracing device which will not impose a destructive load on the pipe line but will afford it an adequate support in its normal position as well as in any of its vibratory phases.

Another object is to provide a pipe line bracing device which can be effectively operated in conjunction with a hanger, either of the constant-support type, which automatically compensates for vertical shifting of the pipe line due to changes in temperature, or of the variable-support type.

Another object is to provide a cushioning pipe brace which is non-resonant and does not impose static load upon the pipe in any normal position assumed by reason of variations of temperature or pressure.

A further object is to provide a pipe sway-brace, which can be easily adjusted while in operative position to vary the dynamic reaction of said brace to movements of the pipe.

Another object is to provide a system of pipe braces and hangers for yieldably supporting and steadying a pipe against vibrations and shocks in all directions.

Other objects and advantages of the invention will be apparent from the following particular description, and from an inspection of the accompanying drawings, in which I have shown a preferred embodiment of my invention and the application thereof. These drawings and the following specification and description are not intended to be exhaustive nor limiting of the invention, but on the contrary are presented with a view to best explaining the invention and principles thereof and the best manner of embodying the same, and it is my intention to enable others skilled in the art to adapt and modify the invention and to construct it in such various forms as may be best adapted for the requirements of any particular condition.

In the drawings:

Figure 1 is a vertical section through a pipe line, and shows in elevation a hanger of the variable-support type and one of a pair of sway braces constructed in accordance with an embodiment of the present invention;

Figure 2 is a top plan view of a system of hangers and sway braces for supporting and steadying a length of pipe line in accordance with an embodiment of the present invention;

Figure 3 is a longitudinal section through the resilient hydraulic portion of the pipe line hanger embodying the present invention;

Figure 4 is a fragmentary side elevation of the indicating portion of the pipe line hanger shown in Figure 3, but with the operating parts in relative position different from that shown in Figure 3;

Figure 5 is a longitudinal section through the hydraulic portion of the sway brace embodying the present invention, and shows one form of valve for regulating the flow of displaced hydraulic liquid during relative movement of its operating parts;

Figure 6 is a transverse section taken on line 6—6 of Figure 5, but on a larger scale;

Figure 7 is a fragmentary longitudinal section of a sway brace, but shows another form of valve for controlling flow of displaced hydraulic liquid;

Figure 8 is an elevation somewhat diagrammatic of a constant-support type of hanger which can be used in conjunction with the pipe bracing system of the present invention; and Figure 9 is a longitudinal section through the resilient hydraulic portion of the hanger shown in Figure 8 but on a larger scale.

Figures 1 and 2 show a system for supporting and bracing a pipe line 10 against the vibrations and swaying incident to normal operation, and against the unusual shocks which may develop as the result of a collision or explosion. This pipe line 10, for instance, may be of the type used for conveying liquids or steam, and has its ends connected to fixed units (not shown). In the case of a power plant, these anchorage units may, for instance, be a condenser at one end of the pipe line 10 and a prime mover such as a turbine or reciprocating steam engine at the other end.

The pipe line 10 is suspended by one or more vertical hangers 11 from an overhead frame structure 12, such as a beam or girder. These hangers support the weight of the pipe line but yield to relieve other stresses, such as those developed by thermal changes or pressure changes within the pipe line and thermal changes or mechanical strains in its supporting structure. The hanger 11 is shown in Figures 1, 3 and 4 as a direct spring-support type, and comprises a rigid link 13, desirably in the form of a tube having its upper end capped to afford an anchorage for a suitable universal connection to the girder 12. This universal connection is shown comprising a clevis 15 which is pivotally secured to an eye stud 16 fixed to the end cap 14 on the tube 13, and is pivotally secured to a bracket 17 fixed to the girder 12. The two pivot axes of this universal connection extend at right angles to each other.

Connected to the lower end of the tube 13 is a spring dashpot mechanism 20, one end of which is connected to the tube 13, while the other end is connected to the pipe 10. In the form shown, one of these ends is an eye-bolt 22 secured to a head 21 which is welded or otherwise affixed to the cylinder 20. The upper end of this cylinder 20 fits snugly in the lower end of the tube 13, and is secured to said tube by a pin 23 passing through said tube and through the eye of the bolt 22. The other end of the spring-dashpot mechanism is an eye-bolt 27 integral with the piston rod 26 extending into the cylinder 20 through the head 24 threaded or otherwise rigidly sealed to said cylinder. The piston 25 welded and/or threaded or otherwise secured on the end of the rod 26 is slidable in the cylinder 20.

The piston rod 26 has a universal connection with the pipe line 10 through the eye 27 pivotally connected to the shackle 28, which, in turn is pivotally connected on a perpendicular axis to a pair of flanges 29 extending radially from a clamp ring 30 on the pipe line 10.

The piston 25 is spring pressed against the gravitational pull of the pipe line 10 by a strong compression spring 32, bearing at its lower end on the cylinder head 24, and at its upper end against said piston 25. This spring 32, being a simple compression spring of uniform pitch and uniform wire diameter, would be harmonic in its characteristics if it were used alone. To overcome this characteristic and avoid the possibility of resonance in the system, there is provided within said main spring with its ends bearing against the cylinder head 24 and the piston 25 respectively, an auxiliary spring 33 which is of varied pitch (or back-wind, i. e., pre-stress in turns which touch one another, which I include in the term "varied pitch") to render it and the system non-harmonic. As shown, this variation in pitch of the auxiliary spring 33 (i. e., variation in the spacing between adjacent convolutions) is shown uniformly progressive, increasing from a minimum at its base to a maximum at its upper end. Under certain conditions, it may be desirable for this spring pitch to vary stepwise (i. e., with different sections of the spring differing in pitch but with the pitch in each section uniform).

To cushion vibrations and shock on the pipe line 10, in both vertical directions and to damp the vibration of the springs 32 and 33, the cylinder 20 is provided with a viscous liquid, such as oil, in the displacement chambers 35 and 36 on opposite sides of said piston. A restricted passage between the chambers 35 and 36 controls the flow of displaced fluid during the relative movements of the piston 25 within the cylinder 20. The capacity of this passageway is controlled by an axial bore 37 accurately formed in a nut 38 threaded on the upper end of the piston rod 26. This nut is interchangeable with others having different bores to vary the damping resistance of the dash-pot, e. g., at the same time that the springs 32—33 my be changed to vary the load capacity. The bore 37 communicates at one end with the displacement chamber 35 and at its other end with an axial bore 40 in said piston rod. Radial bores 41 in the piston rod 26 complete the passage to the chamber 36.

To seal the cylinder 20 against leakage, the cylinder head 24 forms part of a stuffing box shown comprising a series of packing rings 44 embracing the piston rod 26, and enclosed in a recess 45 in said cylinder head. A gland 46 is threaded in this recess 45 against the packing rings 44 and is locked in position by a nut 47.

A fitting 48 in the cylinder head 21 permits filling of the cylinder 20 to the required extent with hydraulic fluid, and a filling air vent in this head is closed by a plug 50.

A cylindrical cup-shaped sleeve 51, connected to the piston rod 26 by any suitable means, as for instance nuts 52, and telescoped over the bottom section of the cylinder 20, cooperates with a scale 54 on the side of the cylinder 20 to give a clear indication of the position of the parts with respect to the proper operating range so that proper adjustment can be determined by simple visual inspection. The upper rim section of this sleeve 51 is desirably lined with a suitable ring 53 of comparatively soft material, such as cork, to prevent clattering, and also to prevent scoring of the outside surface of the cylinder 20. This sleeve 51 also serves to protect the piston rod 26 against dust and thus to avoid deterioration of the gland which might result from dust collecting on the piston rod.

As described, the spring dash-pot hanger 11 serves not only to support the pipe line 10, but also to damp its vertical vibrations and to cushion any shock, while permitting free movements of said pipe line at low velocity, e. g., resulting from thermal variations. To brace the pipe line 10 against sway, and lateral vibrations and shock, braces 60 may be used as shown in Figs. 1, 2, 5 and 6, desirably inclined at approximately an angle of 45° with respect to the horizontal and at an oblique angle to the axis of the pipe. If the pipe is one which may be subject to resonant vibrations of wave length comparable to the spacing of the hangers and braces, such spacing should be irregularly varied. Although two of these braces 60 are shown in Fig. 1 arranged on opposite sides of every fourth hanger 11, it should be understood that the number of braces employed and their positioning will depend on a number of factors, as for instance, the size and form of the pipe line, the liquid used for hydraulic flow in the dash-pot, the size of the braces, the limit of shock or vibration intensity to be reacted, and the position and strength of anchoring structures available.

Each of the braces 60 comprises a rigid link 13a which may be substantially the same structurally as the link 13 already described. This is connected at its upper end to the overhead girder 12 by a suitable universal connection the parts of which are similar to and are, therefore, indicated by the same numbers as those already described on the hanger 11, except that in this case the reference numerals are designated c.

Connected to the lower end of the rigid tube 61 is a dash-pot mechanism, and below this another universal connection of similar structure indicated by corresponding reference characters (designated a) as at the bottom of the hanger 11.

The dash-pot mechanism here shown comprises a hydraulic cylinder 66 closed at one end by a head 67, which is welded as shown or otherwise affixed to said cylinder, and which carries a suitable anchoring member, as for instance an eye stud 68 welded, threaded or otherwise secured or integral thereon. Movably mounted in said cylinder is a piston 70 connected to a piston rod 71, and provided with packing rings 86 and by-pass openings 92—93—96 more particularly described below. The piston rod 71 is slidable in a gland 72 threaded into the other end of the cylinder 66. A nut 73 threaded on an axial reduced extension 74 of the gland 72 bears against the lower end of the cylinder 66 to lock said gland in adjusted position.

The opposite side of the gland nut 74 extends into the outer bore of the cylinder 66 where it forms one end of the stuffing box for the piston rod 71, the other end being formed by a backing ring 110 bearing against an annular shoulder 111 formed in the inner periphery of the cylinder 66. A series of packing rings 112 are clamped between the backing plate 110 and the gland nut 72, and thus are expanded into fluid-tight sliding contact with the piston rod 71 and against the inner periphery of the cylinder 66. If oil is used in the cylinder 66, the packing rings are advantageously made of one of the oil-resisting elastic polymers, especially neoprene (polymerized beta-chloro-butadiene) or a fabric impregnated with a suitable elastic polymer. The end 113 of this gland nut 72 is shaped to receive a suitable wrench for turning it down into clamping relation.

One of the relatively movable parts of the dash-pot mechanism, as for instance the cylinder 66, is connected to the supporting structure 12, in this case through the rigid tubular link 61, while the other relatively movable part, as for instance the piston rod 71, is connected to the pipe line 10. For connecting the cylinder 66 to the link 61, the upper end of said cylinder shown in Fig. 5 fits into the bore of the tube 61, and a pin 75 fits through aligned holes in said tube and the eye of the stud 68. At the other end, the piston rod 71 is shown threaded into the base of a clevis 76, which, in turn is pivotally connected by the pin 80 to one eye of a double eye link 81. The other eye of this link 81 is pivotally secured between a pair of flanges 82 extending radially from the pipe clamp 30. The two pivotal eye connections to the link 81 have their axes at right angles to each other so as to permit universal movement between the pipe line 10 and the brace 60.

The cylinder 66 is substantially filled with a liquid such as oil to resist the relative movement of the cylinder 66 and the piston 70, and the extent of this resistance is controlled by a valve passage in said piston establishing communication between the two displacement chambers 84 and 85 on opposite sides of said piston.

The piston assembly desirably comprises a pair of opposed plunger cups 86 of suitable flexible material, such as leather or duck impregnated with an elastic polymer, advantageously neoprene, which extend into fluid-tight resilient contact with the inner periphery of cylinder 66 and are sealed to the piston by clamping between the piston nuts 89 and 91 threaded or otherwise clamped on the upper end of the piston rod 71. The plunger cups 86, as shown, are axially spaced by a metal washer 87, disposed between a pair of washers 88 of fibre or similar packing material. A metal washer 90 is used beneath the clamping nut 91 to protect the parts 86—88 during rotation of the nut 91 and to distribute its clamping pressure.

The collar 89 has a series of ports 92, two being shown diametrically opposed and extending obliquely with respect to the axis of said collar. The piston rod 71 has an axial bore 93 communicating with the ports 92, to form a passageway between the two displacement chambers 84 and 85.

To control the flow of hydraulic liquid through the passageway 92, 93, there is provided a valve member 95, which is shown in Figs. 5 and 6 as of the rotary type, and which extends with a snug rotary fit in the central bore 93 of the piston rod 71. This valve member 95 is formed with a pair of diametrically opposed recesses 96 extending lengthwise thereof and movable by the rotation of said valve member into or out of registry with the valve ports 92 to selectively restrict flow between the ports 92 and the piston rod bore 93.

For turning the valve member 95 into selective rotary position without disassembling the brace 60, said valve member 95 is provided with a stem 98 extending in the axial bore of the piston rod 71 and threaded in a nut 77 on the end of the piston rod 71. This valve stem 98 projects beyond the nut 77, and is formed with an exposed easily accessible wrenching end 100 formed to engage with a wrench. A nut 101 on the projecting portion of the valve stem 98 locks said stem in adjusted rotary position.

In Fig. 7 is shown another form of valve member 95a which may be used for controlling the flow through the valve passage between the two displacement chambers 84 and 85. In this modified construction, the valve member 95a is of solid cylindrical form with a conical or rounded end, and controls the valve passageway according to its axial rather than to its rotary position by turning down of the threaded stem.

To seal the piston rod 71 against leakage through its axial bore, the valve stem 98 is formed with a series of spaced cylindrical enlargements or light fitting bushings 103 (Fig. 5) having snug rotary fit in said bore to provide a labyrinth packing. Near its end the valve stem 95 carries a metal bushing 105 press-fitted or otherwise secured to said rod, a sleeve 106 of compressible packing material such as duck impregnated with neoprene is fitted on the rod against said bushing 105, and one or more ring nuts 107 threaded on said valve stem beyond the packing sleeve 106. The nut 77 on the end of the piston rod 71 with a compressible packing washer 78, also of duck impregnated with neoprene, complete the seal of said piston rod.

A sleeve 115 threaded or otherwise secured on the cylindrical upper base section of the clevis 76 serves to enclose the piston rod and give visual indication of the operative relation of the parts as already indicated in connection with the sleeve 51 in Figs. 3 and 4. This sleeve 115 is loosely telescoped over the bottom section of the cylinder 66; and a ring 116 fixed to the free end of the sleeve 115 has a snug sliding fit with the outer periphery of the cylinder 66, and has its outer rim chamfered, so that the edge thereof forms a convenient gage in conjunction with a series of lines inscribed or otherwise marked on the outer surface of cylinder 66, as in the construction shown in Fig. 4.

With this dash-pot brace 60 mounted as shown in Figs. 1 and 2, any "whip," swaying or vibration of the pipe line 10 either vertically or horizontally will be effectively damped, and any unusual shocks to which the supporting structure may be subjected will be cushioned and largely absorbed before being transmitted to the pipe. This brace 60 is self-adjusting in its resistance to the movements of the pipe line 10, in that gradual movements of said pipe line are freely permitted, while the more violent movements are effectively resisted. This characteristic of the brace 60 is highly advantageous, since it permits the gradual movements of the pipe resulting from thermal expansion or contraction, and thereby relieves those destructive strains which would otherwise develop if the movements of the pipe line 10 were rigidly resisted or if the connection were solely through a spring.

It is an important advantage of this structure that thermal movements of the pipe do not impose any additional load on the pipe line 10. With this characteristic of the brace 60, any adjustments in the hanger 11 will not be affected by the brace 60 either in normal position or in any of its shock absorbing phases.

The brace 60 may be used in conjunction with a hanger 11 of the variable-support type as shown and described, but is particularly advantageous in conjunction with a hanger of the constant or balanced-support type (i. e., of the type in which vertical shifts in the position or axial configurations of the pipe line are automatically compensated for, to maintain constant the supporting force on said pipe line). In such a balanced support type of hanger, it is important that the sway braces do result in loading or variably supporting the pipe line, which would, if allowed, affect adjustments in said hanger.

In Figs. 8 and 9 is shown a form of constant-support hanger 11a, which is particularly adapted for use in conjunction with the braces 60. This hanger, for instance, may be of the general type shown in my prior Patent No. 2,208,064, and is shown comprising a channel frame 120 affixed to the girder 12. Pivotally secured to this frame 120 is a bell crank lever 122, one of the lever arms of which is branched at 123 and pivotally connected on each branch to one of the anchored spring units 124, shown in detail in Fig. 9. The other arm of the bell crank 122 is pivotally connected to the pipe line 10 through a hanger link 125 similar to the link 13 except that it is capped and universally pivoted at both ends.

The construction shown in Figs. 8 and 9 differs from the patented construction above referred to in that the simple main springs shown in the patent are replaced by spring dash-pots 124. These, as shown in Figs. 8 and 9 comprise an hydraulic cylinder 127, a piston 128 with restricted flow orifices 135—136, and a main load-supporting compression spring 129. At one end the cylinder 127 is closed by a head 130 carrying an eye bolt 131 for anchoring to the frame 120. The other end is closed by a head 132 provided, as shown, with a stuffing box for a piston rod 133 similar to that described above in connection with Fig. 3, and a clamping ring and gasket sealing it to the cylinder.

The piston rod 133 terminates in an eye 134 for pivotal connection to the lever branch extensions 123.

The cylinder 127 is filled with a liquid such as oil, and the passageways 135 are suitably restricted by orifice plugs 136 threaded into said piston, so that flow of the liquid is free for the slow movements due to thermal changes but is too slow to follow vibratory movements or shocks.

The braces 60, in a long pipe line, are desirably arranged at irregular intervals along the pipe line and usually may be spaced at longer intervals than the hangers 11 or 11b as shown in Fig. 2. In the arrangement shown, a pair of opposed braces 60 on opposite sides of the pipe line 10 are arranged for every four or five hangers. These braces 60 are inclined in plan view at approximately eighty to eighty-five degrees with respect to the axis of the pipe line, and are arranged so that the braces 60 of each opposed pair extend with their line of action in substantially parallel vertical planes. Alternate pairs of braces 60 are inclined in opposite directions, so that adjacent hangers alternately converge and diverge towards said pipe line. With this arrangement of hangers and braces as shown in Fig. 2, movements of the pipe line 10 in any direction are effectively resisted, and shocks imposed on said pipe effectively absorbed.

What I claim is:

1. A device for connecting a suspended pipe to a rigid support to steady the pipe against vibration and shock, but to permit relatively slow movement of the pipe, which comprises a chamber, a piston within said chamber in fluid-tight engagement with the internal wall of the chamber, a piston operating rod extending from said piston out through the wall of said chamber, packing means for said piston rod substantially sealing said chamber, means for attachment of the piston operating rod and the chamber respectively, whereby the one will be attached to a pipe and the other to a rigid support, said device having a passageway therein with an effective opening sufficient to permit flow of fluid in said chamber from one side of the piston to the other side thereof to accommodate freely movements of the piston due to temperature changes in said pipe, but the area of said opening being sufficiently restricted to offer substantial resistance to flow due to movements of said piston resulting from sudden impulses of said pipe.

2. A device for connecting a suspended pipe to a rigid support to steady the pipe against vibration and shock, but to permit relatively slow movement of the pipe, which comprises a cylinder, a piston within said cylinder in fluid-tight engagement with the internal wall of the cylinder, a piston rod extending from said piston out through one end of said cylinder, means closing said end of the cylinder and including a packing for said piston rod, means for attachment of the piston rod and cylinder whereby the one will be attached to a pipe and the other to a rigid support, said device having a passageway therein open to permit flow of fluid in said cylinder from one side of the piston to the other side thereof, to accommodate freely movements of the piston due to temperature changes in said pipe but the area of said opening being restricted to offer substantial resistance to flow due to movement of said piston resulting from sudden impulses of said pipe.

3. A device for connecting a suspended pipe to a rigid support to steady the pipe against vibration and shock, but to permit relatively slow movement of the pipe, which comprises a cylinder, a piston within said cylinder in fluid-tight engagement with the internal wall of the cylinder, a piston rod extending from said piston out through one end of said cylinder, means closing said end of the cylinder and including packing for said piston rod, means for attachment of the piston rod and cylinder whereby the one will be attached to a pipe and the other to a rigid support, said device having a passageway therein open to permit flow of fluid in said cylinder from one side of the piston to the other side thereof, and means for varying the effective opening of said passageway to afford flow to accommodate free movements of the piston due to temperature changes in said pipe, but to control the resistance to flow due to movements of said piston resulting from sudden impulses of said pipe.

JOSEPH KAYE WOOD.